Patented July 7, 1931

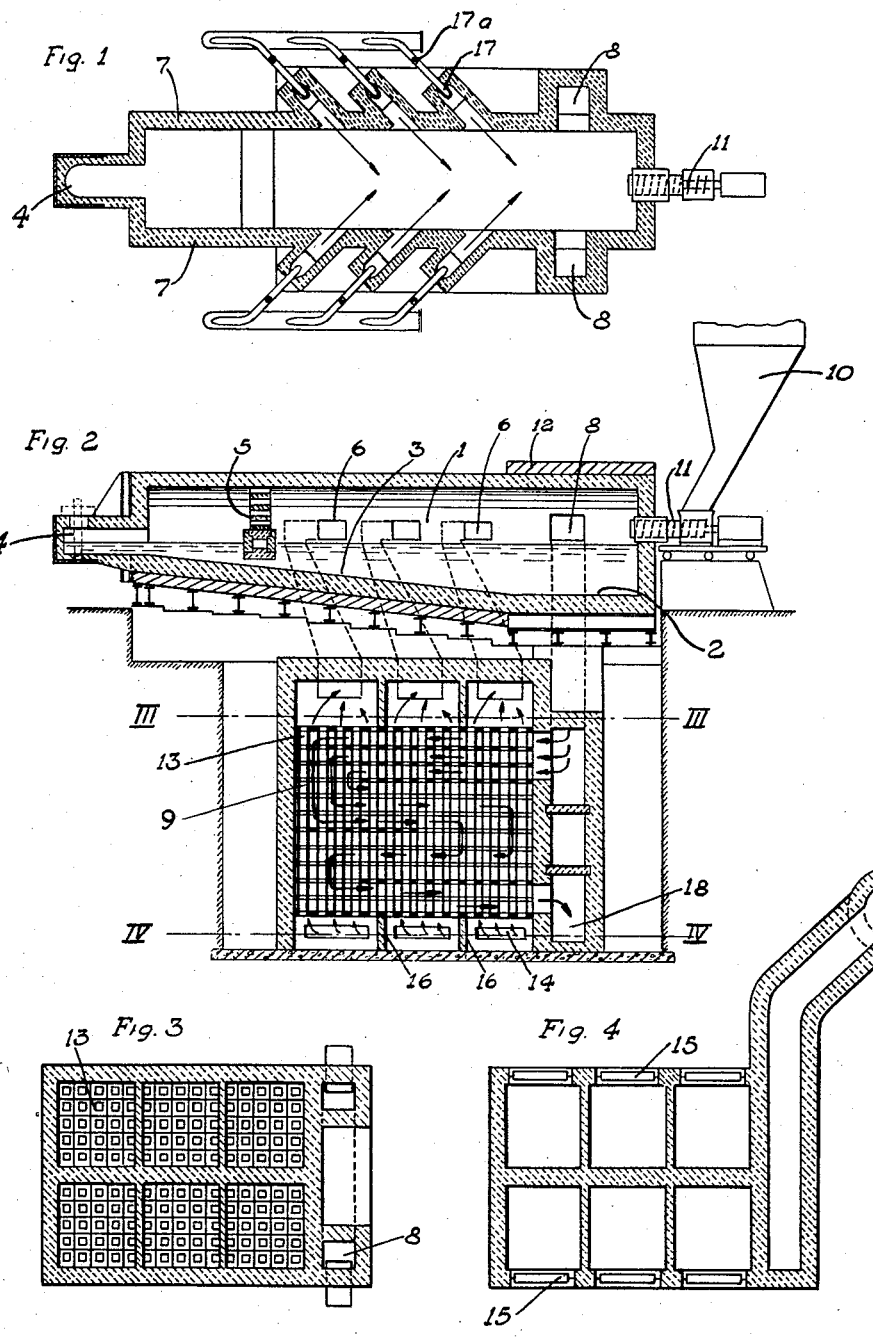

1,812,975

UNITED STATES PATENT OFFICE

WILLIAM A. MORTON, OF PITTSBURGH, PENNSYLVANIA

GLASS MELTING APPARATUS

Application filed September 15, 1928. Serial No. 306,269.

This invention relates to improvements in glass melting furnaces, and it is among the objects thereof to provide a furnace structure which is designed to produce a more nearly uniform and better quality product, and which shall be adapted for regulation of the applied heat to the glass batch in a manner to heat the body of the material to the most efficient and desirable temperatures in different sections of the furnace.

Another object of the invention is to provide an improved form of heat regulating means for glass melting furnace operation.

Still another object of the invention is to provide means for directing the fuel stream in the furnace chamber in a direction opposed to the glass stream flow whereby certain detrimental features of glass melting are eliminated.

In glass melting furnaces as heretofore constructed and operated, the furnace chamber was designed to maintain a constant pool depth of the molten glass through the employment of a flat bottom hearth and the material was fed in from the batch feeder and passed through the heating portion of the chamber which was located centrally of the furnace structure.

In accordance with the present invention I employ a furnace in which the hearth is substantially flat at the batch feeding end and gradually tapers upwardly in the direction of the glass discharge end of the furnace to accelerate the glass flow.

I also provide for regulation of the heat in the different portions of the furnace by regulating the burners, which I accomplish by the utilization of separate air passages in the recuperator, which passages are adapted to be independently regulated.

The general arrangement and function of my improved glass melting furnace will be more clearly understood in connection with a description of the accompanying drawings constituting a part hereof, in which like reference characters designate like parts, and in which Fig. 1 is a longitudinal sectional view of a furnace chamber embodying the principles of this invention; Fig. 2 a vertical sectional view of a furnace structure as shown in Fig. 1 and of a recuperator with which it is associated; and Figs. 3 and 4 are sectional views of the recuperator taken along the lines III—III and IV—IV of Figure 2.

Referring to Figure 2 of the drawings, the structure therein illustrated comprises a glass melting furnace generally designated at 1, having a substantially flat bottom hearth 2 at the batch feeder end and having a gradually tapering portion 3 extending to the glass feeder end 4 of the furnace. A heat retaining wall 5 is disposed transversely of the furnace chamber near the feeder end, as is common practice in the art, and a series of fuel burner ports 6 are disposed in the side walls 7 of the chamber in which combustion takes place. The waste gases or products of combustion from the ports 6 pass through the waste flue 8 to the recuperator generally designated at 9.

The batch feeding end of the furnace comprises a hopper 10 having a feed screw conveyor mechanism 11 for feeding raw materials into the charging end of the furnace and the material may be continuously or intermittently fed into the furnace chamber.

Since it is desirable to maintain a maximum of heat at the charging end of the furnace, a heavy wall of insulation 12 may be provided as shown and the recuperating port 8 for the waste gases leaving the furnace chamber is disposed in spaced relation from the charging end of the furnace for a purpose to be hereinafter explained.

The recuperator port 8 directs the waste gases or products of combustion to the checker work for preheating air for the burners. The checkerwork comprises a tile structure 13 forming longitudinal passages for the waste gases, and vertical flues or passages for the air, the entrance of which is through ports 14 regulated by adjustable dampers 15 shown in Fig. 4.

The recuperator is divided into separate chambers by partition members 16 so that the amount of air for each chamber can be regulated by the individual dampers to furnish a desired quantity of preheated air for the burners 17 which are disposed in the burner ports 6 and controlled by valves 17a.

The waste gases passing through the checker work in the manner indicated by arrows will ultimately pass out the waste stack flues or passages 18 leading to the stack 19.

Referring to Fig. 1 of the drawings, the burners 17 are disposed at an angle projecting in the direction parallel with the flow of material fed into the furnace but opposed thereto for a purpose to be hereinafter explained.

The function and operation of the furnace disclosed is briefly as follows: The raw materials are fed from the hopper 10 through feeder 11 into the furnace chamber in such quantities that a predetermined level of molten material is maintained in the chamber, this level being above the opening through fire wall 5 which divides the chamber into heat zones, and the level of material is slightly below the burner ports 6 so that the heat of combustion from the burner 17 will be of greatest intensity on the surface of the mass. With the disposition of the waste ports 8 remote from the charging end of the furnace and leading to the recuperator, the waste gases do not come in contact with the raw dusty materials, and by so removing the waste gases from the batch feeding entrance, the raw dusty materials have an opportunity to glaze before entering into the path of the several flame streams from the burners.

In the angular disposition of the burner ports the movement of the waste gases is opposed to the glass stream flow whereby the lighter glass constituents are retarded in their forward flow in their first stage of ebullition or chemical activity. This feature is considered to be a very beneficial and distinct advance in the art.

By means of the regulation of heat intensity at the respective burner ports through the damper elements 15 and the segregated preheating air chambers of the recuperator, it is possible to regulate each successive port or firing zone in the furnace chamber so that the temperature may be accelerated towards the discharge end of the furnace where the glass depth is decreased on account of the inclined hearth 3, for the purpose of subjecting the whole depth of the glass mass to more nearly uniform temperature and consequently reduced to greatly diminished and nearly the same viscosity, whereby any submerged formative gas bubbles are forced to move to a zone of intensively higher temperatures so that they may readily rise to the surface to be released. Where such formative gas bubbles are included in a glass mass due to greater viscosity of the mass at the discharge end of the furnace, the product of the furnace becomes defective. The degree of inclination of the furnace hearth and the depth of chamber will vary somewhat with the kinds and color of glass to be melted.

By means of the separate heat control of the burners it is possible to obtain acceleratively higher temperatures towards the area of increased stream flow of the molten glass. I also insulate the batch feeder end of the furnace with top and wall sections of extra thickness, to retain the heat of the lower temperature waste gases flowing into the recuperator ports. The glass retaining walls of the furnace may be insulated with a high refractory material such as Silocel or other infusorial earth of low heat conductivity, to prevent excessive radiation losses in the zone of highest temperature.

The glass feeder end of the furnace is of the conventional extended form with submerged discharge outlet by which the glass is removed from the furnace and the flow through the furnace is effected.

It is evident from the foregoing description of this invention that by employing the type of glass melting furnace therein described, I maintain constant fuel flow to a constant stream flow with constant uniform temperature in any cross-sectional area through the tank and that the material flowing through the tank is capable of longitudinal acceleration at will to increase the rate of formation and refining of the forming solution. With the apparatus and method of operation described, I am able to maintain uniformity of quality in the product of the furnace.

Although an embodiment of the invention has been herein illustrated and described, it will be obvious to those skilled in the art that various modifications may be made in the details of construction without departing from the principles herein set forth.

I claim:

1. Glass melting apparatus comprising a hearth shaped to accelerate the glass flow, and burners arranged to produce a flame stream flowing in the reverse direction to the glass flow.

2. A continuous stream type glass melting apparatus having a defined flow direction for the melting glass, heating means therefor, and means for retarding the flow of the upper stratum of the stream by the heating means.

3. In a glass melting furnace, a hearth with glass flowing through the longitudinal axis in one direction and the flame stream or heating medium flowing in the opposed direction, ports for delivering the heating medium continuously to the glass stream and ports at the opposite end for removing the glass continuously.

In testimony whereof I have hereunto set my hand this 7 day of September, 1928, at Pittsburgh, Pa.

WILLIAM A. MORTON.